United States Patent
Lee et al.

(10) Patent No.: US 7,417,101 B2
(45) Date of Patent: Aug. 26, 2008

(54) THERMO-RESPONSIVE WATER-SOLUBLE POLYMERS FOR VISCOSITY SWITCH

(75) Inventors: Hsun-Yu Lee, Taichung (TW); Chih-Hsiang Lin, Taipei (TW); In-Mau Chen, Jhubei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 242 days.

(21) Appl. No.: 11/283,805

(22) Filed: Nov. 22, 2005

(65) Prior Publication Data

US 2006/0235176 A1 Oct. 19, 2006

(30) Foreign Application Priority Data

Apr. 13, 2005 (TW) .............................. 94111744 A

(51) Int. Cl.
*C08F 26/08* (2006.01)
*C08F 20/54* (2006.01)
*C08F 20/06* (2006.01)

(52) U.S. Cl. ................. 526/264; 526/303.1; 526/307.2; 526/307.3; 526/307.6; 526/317.1

(58) Field of Classification Search ................. 526/264, 526/303.1, 307.2, 307.3, 307.6, 317.1
See application file for complete search history.

(56) References Cited

U.S. PATENT DOCUMENTS

| | | | |
|---|---|---|---|
| 5,238,545 A * | 8/1993 | Yoshioka et al. | 204/462 |
| 6,372,141 B1 * | 4/2002 | Okano et al. | 210/635 |
| 6,427,378 B1 * | 8/2002 | Obonai et al. | 47/44 |
| 6,616,946 B1 * | 9/2003 | Meier et al. | 424/489 |
| 6,765,081 B2 * | 7/2004 | Lin et al. | 528/310 |

* cited by examiner

*Primary Examiner*—Helen L. Pezzuto
(74) *Attorney, Agent, or Firm*—Bacon & Thomas, PLLC

(57) ABSTRACT

A thermal responsive, water soluble copolymer is disclosed, which comprises the co-polymerization product of: (a) 0.5~20 wt % of N-isopropyl acrylamide (NIPAAm); (b) 0.5~20 wt % of 1-vinyl-2-pyrrolidinone (VPD); (c) 0.01~10 wt % of acrylic acid (AA); and (d) 80~90 wt % of acrylamide. The viscosity of the co-polymerization product is adjustable by temperature. Moreover, phase-separating does not occur in the copolymer while temperature is changing and the structure as well as the fluidity are maintained, therefore, the copolymer of the present invention is suitable for the application of a micro-fluidic chip.

4 Claims, No Drawings

THERMO-RESPONSIVE WATER-SOLUBLE POLYMERS FOR VISCOSITY SWITCH

BACKGROUND OF THE INVENTION

1. Field of the Invention

The present invention relates to polymer materials and more particularly to thermal responsive, water-soluble polymers.

2. Description of Related Art

Materials that adapt to environmental stimulations to change their own properties are called smart polymers. Smart polymers adapt to chemical or physical stimulations including temperature, pressure, pH value, and electric fields to initiate contracting or expanding and produce a change larger than 1,000 times their original size. Current development in smart watergel of smart polymers mainly seeks to (1) adapt to stimulations of different fields or different properties; (2) achieve a fast responsive property; and (3) respond within a small stimulation range. Due to the unique property of smart watergel, it is applied in various fields such as pharmaceuticals, chemistry, environmental engineering, and biological fields.

The solubility of most polymer materials increases as the temperature rises. Nevertheless, the solubility of smart watergel decreases as the temperature rises. This property is referred to as the lower critical solution temperature (LCST). This phenomenon is due to the hydrogen bonding between a hydrophilic portion of the polymer and the water molecule being stronger at low temperatures; thus it is dissoluble. When the temperature rises, the hydrophobic portions of the polymer have a stronger inter-reaction, causing a weakened reaction with hydrogen bonding of the water molecule, therefore the solubility is decreased.

Watergel is a three-dimensional polymer with a net structure that expands or contracts when adsorbing or abstracting the solvent. This characteristic makes the property of watergel fall between liquid and solid. Presently, the main limitations of the application of watergel in industry are the difficulties in shape, size, and phase variety. Researchers have been enthusiastically seeking how to apply smart watergel in biomedicines, drug release agents, and tissue engineering. Meanwhile, the temperature and pH value of watergel are the main factors to be controlled to adapt to human bodies. Consequently, to design a fast-response smart watergel having biological-compatibility (bio-degradable) is the current developmental goal.

A microfluidic chip is a chip full of capillary channels for small volume as microliter or even nanoliter fluid infused therewithin, to carry out manipulations in a laboratory such as mixing, isolating, culturing, heating, and the process of PCR (polymerase chain reaction) by means of mechanical or non-mechanical pumping. In the microfluidic chips for the isolating process, the biological materials to be isolated or cultured are contained in the isolating fluid. To achieve the best result, the isolating resolution and its fluidity of the isolating fluid in the capillary channels should be considered. Accordingly, applying smart watergel in microfluidic chips and controlling the temperature externally for viscosity variation in the capillary channel can improve the fluidity and resolution of the microfluid. When a utilizing polymer with a net structure to process high resolution isolating, the fluid with high molecule weight will not damage the structure or effect the fluidity due to the phase isolation created by temperature change.

SUMMARY OF THE INVENTION

The present invention discloses a thermal responsive, water-soluble copolymer that controls its viscosity via external temperature. Therefore, the structure damage or fluidity effect will not occur when the phase separation generates while the temperature is changing in an uncontrolled manner. Thus the water-soluble copolymer of the present invention is particularly ideal in microfluidic chip applications.

The present invention utilizes at least two monomers among N-isopropyl acrylamide (NIPAAm), 1-vinyl-2-pyrrolidinone (VPD), and acrylic acid (AA). A copolymer with thermal-reversible solubility is formed via free radical copolymerization and grafted at various ratios to the hydrophilic portion of the high molecule weight polyacrylamide. The copolymer displays a high viscosity when the temperature increases to a certain point (LCST). Altering the ratio of the monomers adjusts the temperature at which the viscosity rapidly changes.

The thermal responsive, water-soluble co-polymer of the present invention can be formed via copolymerization of the following monomers: 0.5~20 wt % of N-isopropyl acrylamide (NIPAAm); 0.5~20 wt % of 1-vinyl-2- pyrrolidinone (VPD); 0.01~10 wt % of acrylic acid (AA); and 80~90 wt % of acrylamide.

The co-polymer of the present invention includes the structure as shown in Formula (I):

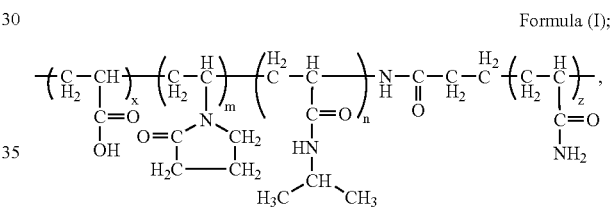

Formula (I);

wherein x, m, n, z are each an integer greater than 1, and the weight concentration ratio of x:m:n:z is 0.03~0.06:0.005~0.19:0.005~0.19:0.8~0.9.

The present invention further discloses another thermal responsive, water-soluble co-polymer that is copolymerized by the following monomers: 0.5~20 wt % of N-isopropyl acrylamide (NIPAAm); 0.5~20 wt % of 1-vinyl-2-pyrrolidinone (VPD); and 80~90 wt % of acrylamide.

The co-polymer of the present invention includes the structure as shown in Formula (II):

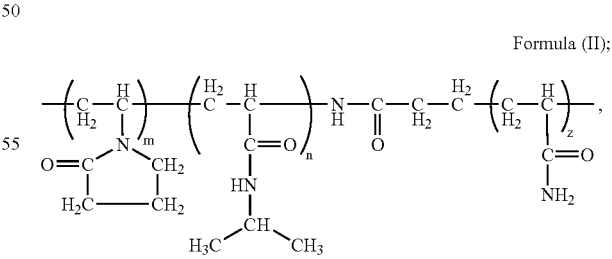

Formula (II);

wherein, m, n, z are each an integer greater than 1, and the weight concentration ratio of m:n:z is 0.005~0.19:0.05~0.19:0.8~0.9.

The lower critical solution temperature (LCST) of the co-polymer of the present invention preferably ranges from 0° C. to 100° C. The viscosity is preferably 50-12000 cp, wherein the viscosity is 60~300 cp when the thermal responsive temperature is at room temperature. When the thermal responsive temperature is increased to 70° C., the viscosity is preferably 5000~11000 cp.

DETAILED DESCRIPTION OF THE PREFERRED EMBODIMENT

Embodiment 1

Manufacturing of Poly (NIPAAm-VPD-AA)

The reaction is shown in flow chart I listed below. The purpose of adding N-Vinylpyrrolidone (VPD) is to increase the LCST of Poly (NIPAAm) material. The purpose of adding monomer acrylamide is to reduce the LCST of Poly (NIPAAm). Lowering the LCST by adding monomer acrylamide is possible because the hydrogen bonding property of carboxyl group (—COOH) in acrylamide is generated, making the material contract easily and precipitate which in turn reduces the LCST.

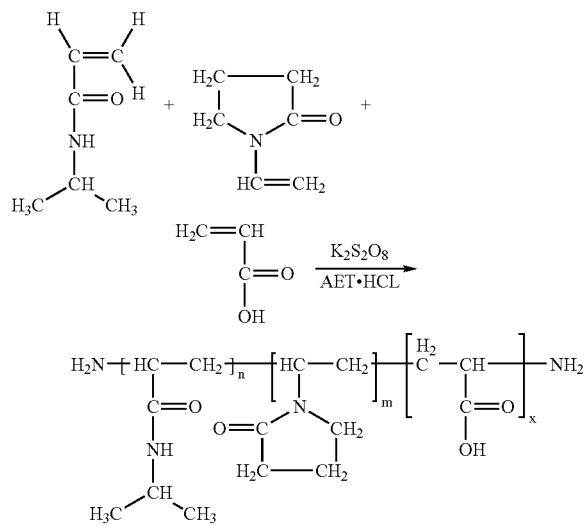

Steps of the reaction are described as following:
(1) Mix the monomers NIPAAm (20 g), VPD (2 g), and acrylic acid (2 g), then stir slowly. Supply nitrogen gas twice to completely remove oxygen.
(2) Take 200 ml de-ionized water and remove oxygen via a vacuum-freezing mode. Transfer the processed de-ionized water with dual syringes in a nitrogen atmosphere to a 500 ml reaction bottle. Stir slowly to completely dissolve the monomers.
(3) Mix 0.5 g initiator (KPS) and 1 g chain transfer agent (AET.HCl) in a bottle and supply nitrogen gas twice to completely remove oxygen in the bottle. Transfer approximately 10 ml of de-ionized water by using dual syringes under a nitrogen atmosphere. Stir slowly to completely dissolve the solids.
(4) Transfer the mixed solution of the initiator and chain transfer agent with dual syringes under a nitrogen atmosphere to a 500 ml reaction bottle. Stir rapidly and slowly heat up the solution.
(5) Maintain the temperature at 45° C. and set for 3 hours.
(6) Add ether to the reacted solution. Obtain liquid from the lower phase after phase-separation. After drying the product under reduced pressure, a light-yellowish powder can be obtained. The powder is the Poly (NIPAAm-VPD-AA) with amine group in its end terminal.

Embodiment 2

Poly (NIPAAm-VPD-AA) having an acrylamido group in the end terminal

The reaction is shown in flow chart II listed below. The purpose of adding acrylic acid is to form the acrylamido group in the end terminal of Poly (NIPAAm-VPD-AA) chain, and provide double bonds for grafting with hydrophilic main chain of polyacrylamide.

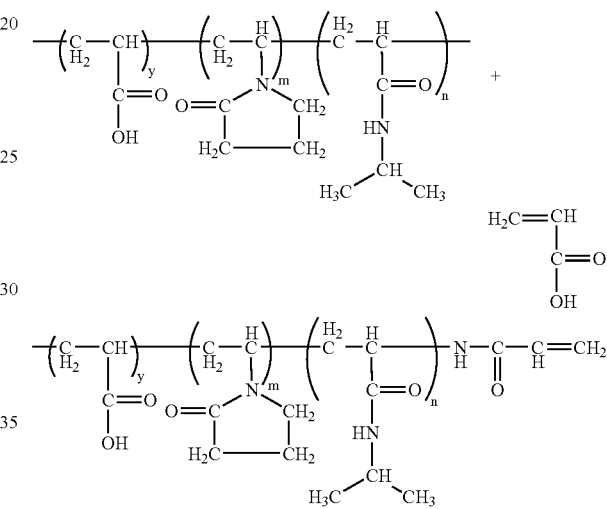

Steps of the reaction are described as following:
(1) Stir Poly (NIPAAm-VPD-AA) (9 g), acrylic acid (1.5 g), DCC1 (4.3 g) and methylene chloride (50 ml) slowly at room temperature.
(2) Take 200 ml de-ionized water and remove oxygen via a vacuum-freezing mode. Transfer the processed de-ionized water by using dual syringes under a nitrogen atmosphere to a 500 ml reaction bottle. Stir slowly to completely dissolve the monomers.
(3) Mix 0.5 g initiator (KPS) and 1 g chain transfer agent (AET.HC1) in a bottle and supply nitrogen gas twice to completely remove oxygen. Transfer approximately 10 ml of de-ionized water by using dual syringes in a nitrogen atmosphere. Stir slowly to completely dissolve the solids.
(4) Transfer the mixed solution of the initiator and chain transfer agent by using dual syringes under a nitrogen atmosphere to a 500 ml reaction bottle. Stir rapidly and slowly heat up the solution.
(5) Stop the reaction after two hours; filter the reacted solution to remove solid residual products.
(6) Add ether to the filtered clear solution. Take the solution from lower phase after phase-separation and dry the product under reduced pressure to obtain a light-yellowish powder, which is Poly (NIPAAm-VPD-AA) with an acrylamido group in the end terminal.

Embodiment 3

Poly (NIPAAm-VPD-AA) and polyAcrylamide grafting

The reaction is shown in flow chart III listed below. The purpose of adding acrylamide is to perform as the hydrophilic main chain. As the external temperature reaches the LCST, the thermal-responsive side chains entangle with each other, and attract and combine with the main chain having a high molecule weight thus the viscosity of the material is enhanced.

Flow Chart III

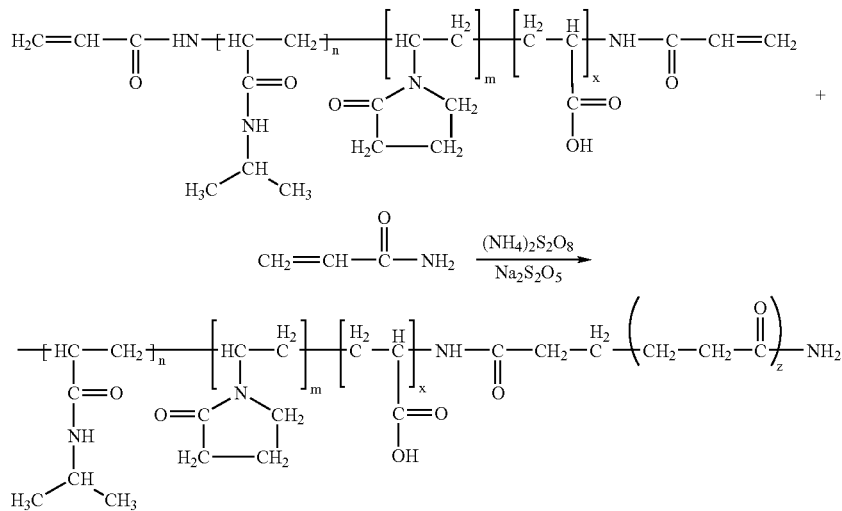

Steps of the reaction are described as following:
(1) Place Poly (NIPAAm-VPD-AA) and acrylamide (2.8 g) in a 100 ml reaction bottle. Supply nitrogen gas twice to completely remove oxygen.
(2) Take 50 ml de-ionized water and remove oxygen via a vacuum-freezing mode. Transfer the processed de-ionized water by using dual syringes under a nitrogen atmosphere to a 100 ml reaction bottle. Stir slowly to completely dissolve the monomers.
(3) Add 0.01 g initiator APS and 0.01 g initiator NaMBS in a nitrogen atmosphere to start the reaction.
(4) Stop the reaction after 4 hours, pour the reacted solution to 1 L acetone to precipitate. Dry after filtering to obtain the product.

Preferred Embodiment 4 viscosity test

Dissolve the product of embodiment 3 in water, and then infuse the produced solution to an Ostward viscometer. Examine the viscosity at different water bath temperatures. When the proportion of acrylic acid in the copolymer increases, the thermal responsive temperature is reduced to room temperature; and the viscosity is 60~300 cp. When the proportion of N-Vinylpyrrolidone in the copolymer increases, the thermal responsive temperature is increased to 70° C.; and the viscosity is 5000~11000 cp.

The smart thermal-responsive, water soluble copolymer comprising two or three monomers of the present invention allows the LCST to increase to 100° C. when the VPD proportion increases, and therefore the solubility of the copolymer is enhanced. When the proportion of AA increases, the LCST will be reduced to 0° C. Varying the proportion of the main chain and the side chain makes this newly disclosed material rapidly change its viscosity and fluidity at various LCSTs. Therefore, when applying the copolymer fluid of the present invention to a microfluidic chip, it is adjustable in accordance with different quality samples to be tested.

Although the present invention has been explained in relation to its preferred embodiment, it is to be understood that many other possible modifications and variations can be made without departing from the scope of the invention as hereinafter claimed.

What is claimed is:

1. A thermal responsive, water-soluble copolymer, which is copolymerized by the following monomers:
   0.5~20 wt % of N-isopropyl acrylamide (NIPAAm);
   0.5~20 wt % of 1-vinyl-2- pyrrolidinone (VPD);
   0.01~10 wt % of acrylic acid (AA); and
   80~90 wt % of acrylamide,
   wherein the copolymer comprises the structure as shown in formula (I):

Formula (I);

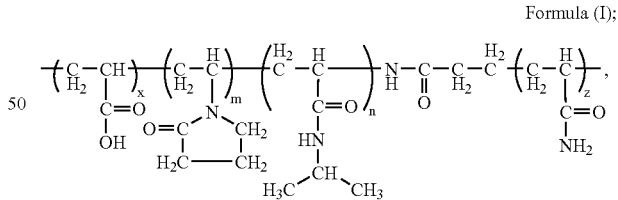

in which, x, m, n, z are independently an integer greater than 1, and the weight concentration ratio of x:m:n:z is 0.03~0.06:0.005~0.19:0.005~0.19:0.8~0.9; and
the viscosity of the copolymer is 60 to 300 cp when the thermal responsive temperature is at room temperature, and the viscosity of the copolymer is 5000 to 11000 cp when the thermal responsive temperature is increased to 70° C.

2. The copolymer as claimed in claim 1, wherein the lower critical solution temperature (LCST) ranges from 0° C. to 100° C.

3. A thermal responsive, water-soluble copolymer, which is copolymerized by the following monomers:

0.5~20 wt % of N-isopropyl acrylamide (NIPAAm);
0.5~20 wt % of 1-vinyl-2-pyrrolidinone (VPD); and
80~90 wt % of acrylamide,
wherein the copolymer comprises the structure as shown in formula (II):

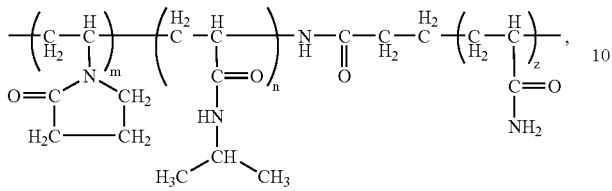

Formula (II);

in which, m, n, z are independently an integer greater than 5, and the weight concentration ratio of m:n:z is 0.005~0.19:0.05~0.19:0.8~0.9; and the viscosity of the copolymer is 60 to 300 cp when the thermal responsive temperature is at room temperature, and the viscosity of the copolymer is 5000 to 11000 cp when the thermal responsive temperature is increased to 70° C.

4. The copolymer as claimed in claim 2, wherein the lower critical solution temperature (LCST) ranges from 0° C. to 100° C.

* * * * *